United States Patent [19]

Lings et al.

[11] Patent Number: 4,616,976
[45] Date of Patent: Oct. 14, 1986

[54] COOLED VANE OR BLADE FOR A GAS TURBINE ENGINE

[75] Inventors: Barry W. Lings, Spondon; John H. Nicholson, Mickleover, both of England

[73] Assignee: Rolls-Royce plc, London, England

[21] Appl. No.: 397,412

[22] Filed: Jun. 28, 1982

[30] Foreign Application Priority Data

Jul. 7, 1981 [GB] United Kingdom ................ 8120939

[51] Int. Cl.$^4$ ............................................. B63H 1/14
[52] U.S. Cl. .................................. 416/97 R; 415/115; 415/116; 415/114; 416/95; 416/96 R; 416/96 A; 416/97 A; 416/232
[58] Field of Search ...................... 415/115, 116, 114; 416/95, 96 R, 96 A, 97 R, 97 A, 232

[56] References Cited

U.S. PATENT DOCUMENTS

| | | | |
|---|---|---|---|
| 4,153,386 | 5/1979 | Leogrande et al. | 415/115 |
| 4,252,501 | 2/1981 | Peill | 416/97 R |
| 4,297,077 | 10/1981 | Durqin et al. | 415/115 |
| 4,312,624 | 1/1982 | Steinbauer, Jr. et al. | 415/116 |

Primary Examiner—Donald P. Walsh
Attorney, Agent, or Firm—Cushman, Darby & Cushman

[57] ABSTRACT

A cooled vane or blade for a gas turbine engine has a cooling arrangement for its trailing region which can be accommodated in the relatively thin section available. In this arrangement the trailing region of the hollow interior of the blade is divided off from the remainder by a partition which may be apertured to allow cooling air to enter the compartment thus formed. The concave, pressure flank of the compartment is cooled by arrays of film cooling holes while the convex, suction flank has a perforated plate spaced therefrom to provide impingement cooling. The suction flank is therefore unapertured and there is no disturbance of the high speed airflow in this region. The spent impingement air leaves the aerofoil via a slot and may pass over pedestals en route to cool the entire trailing edge.

5 Claims, 3 Drawing Figures

COOLED VANE OR BLADE FOR A GAS TURBINE ENGINE

This invention relates to a cooled vane or blade for a gas turbine engine.

The purpose of these vanes or blades is to interact aerodynamically with the gas flow of the engine to produce a desired result, and in consequence the aerofoil shape of the vane or blade is of paramount importance. Unfortunately the aerofoil shape also influences the envelope available within the aerofoil for cooling systems. As the understanding of the aerodynamics of the aerofoil has improved, the aerofoil shapes have varied, culminating in present day designs which tend to have relatively thin trailing portions and which may also have a varying degree of curvature over the longitudinal extent of the aerofoil. It is clearly difficult to accommodate a cooling system in such a thin shaped trailing edge region, particularly bearing in mind that it is undesirable to have film cooling air disturbing the high speed flow on the suction flank of this trailing region.

The present invention provides a vane or blade having a cooling system which can be accommodated in a relatively thin trailing section of the aerofoil but which enables suitable cooling to be achieved.

According to the present invention a cooled vane or blade for a gas turbine engine comprises a hollow aerofoil have a concave pressure flank and a convex suction flank, partition means dividing a trailing edge compartment from the remainder of the hollow interior, an aperture or apertures adapted to allow the flow of cooling air into said compartment, a perforated impingement plate mounted spaced from the inner surface of the unapertured suction flank of the compartment, the opposed, pressure flank of the compartment being provided with an array of film cooling holes, and a cooling air ejection hole or holes in the trailing edge of the air flow communicating with the space between the said plate and said surface so as to allow the impinged air to escape from the airflow.

Said aperture or apertures may be formed in said partition means.

There may be an array of pedestals or pin fins in the flow path of the cooling fluid between said space and said air ejection hole or holes.

The partition may be apertured adjacent the longitudinal extremity of the aerofoil distant from the entry of cooling air into the aerofoil, whereby the air is caused to transverse the longitudinal extent of the mid section of the aerofoil to provide cooling thereof before it flows into said compartment.

The invention will now be particularly described, merely by way of example, with reference to the accompanying drawings in which.

Figure 1:
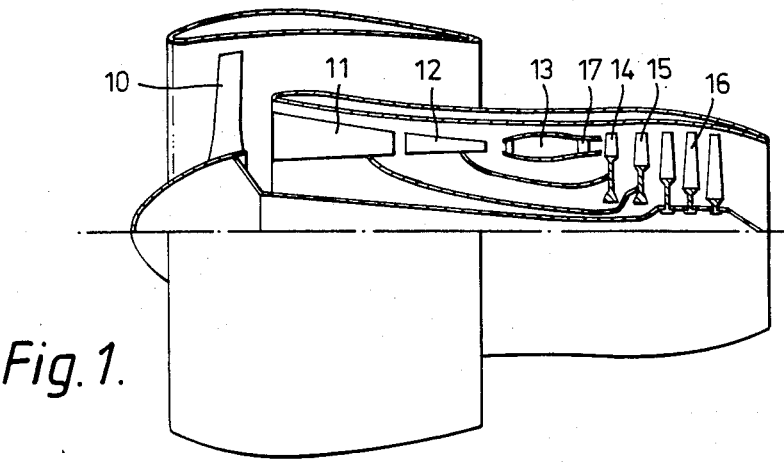
FIG. 1 is a partly broken away view gas turbine engine having vanes in accordance with the invention.

In FIG. 1 there is shown a gas turbine engine comprising a fan 10, intermediate and high pressure compressors 11 and 12, a combustion chamber 13 and high, intermediate and low pressure turbines 14, 15 and 16. Operation of the engine overall is conventional and is not elaborated herein.

The high pressure turbine 14 is operated by hot gas from the combustion chamber 13, and the gas is directed on to the turbine by a stage of nozzle guide vanes 17. Because the vanes 17 operate in an environment of very hot gas they must be cooled, and FIGS. 2 and 3 illustrate the design of the vanes 17 which enables the necessary cooling to be provided.

Figure 2:
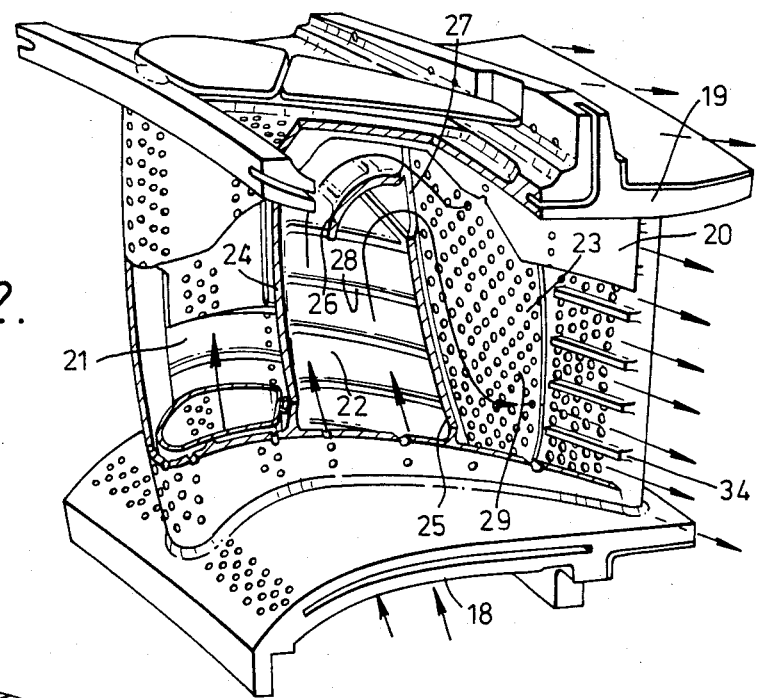
FIG. 2 is an enlarged cut away view of the vane of the engine of FIG. 1.
Figure 3:
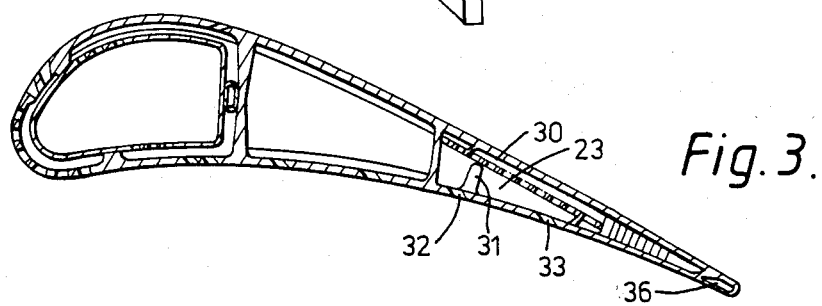
FIG. 3 is a section through the mid height of the aerofoil of the vane of FIG. 2.

In FIG. 2 it will be seen that each vane 17 comprises inner and outer platforms 18 and 19 and a hollow aerofoil 20. The hollow interior of the aerofoil is divided into leading edge, mid and trailing edge compartments 21, 22 and 23 by partitions 24 and 25. The leading edge and mid compartment 21 and 22 break through the inner platform 18 to provide entry ports for cooling air. This cooling air will normally be bled from the later stages of the high pressure compressor 12, and ducted past the combustion chamber 13 to the underside of the inner platform 18. It may then enter the compartments 21 and 22 as illustrated by the views in FIG. 2.

The leading edge compartment 21 is provided with a conventional impingement tube and film cooling system similar to that described in our prior U.S. Pat. No. 3,799,696, and will not be further described in this specification.

In the mid compartment 22 the cooling air is allowed to flow longitudinally or spanwise of the vane 17 until it approaches the end of the aerofoil adjacent to the outer platform 19. It then deflects, helped by a deflector member 26, through an aperture 27 in the partition 25 and into the rearward compartment 23. In flowing through the compartment 22 the cooling air provides convection cooling of this section of the vane and the effectiveness of this cooling is aided by the provision of ribs 28 projecting from this inner surface of the compartment transverse to the general direction of cooling air.

In the rearward compartment 23, a perforated impingement plate 29 is mounted, spaced by a small distance from the inner surface 40 of the portion of the convex suction flank 42 of the compartment 23. This plate 29 divides the compartment 23 into a spanwise and chordwise first area which overlays the main portion of the surface 40 of flank 42 and a spanwise and chordwise extending second area which overlies the main portion of an inner surface 48 of the pressure flank 44, and the size of the perforations and the space between the plate and the surface are arranged to be sure as to cause the cooling air to flow in the form of jets which impinge on the surface to cool it. This enables the convex suction flank of the compartment to be effectively cooled without the necessity of allowing the cooling air to penetrate the wall of the aerofoil and to disturb the high speed flow in this region.

The plate 29 is not of any great thickness and therefore needs support of some kind. In the present instance some support is provided by ribs 30 extending from inner surface 40 of the suction flank 42 in this portion of the compartment 23, and discrete projections 31 extending from the inner surface 48 of opposite pressure flank 44 in this portion of the compartment 23. The projections 31 hold the plate 29 against the ribs 30 when the vane 17 is not in operation. When the vane 17 is in operation, pressure of the cooling air will force the plate 29 to abut against the ribs 30. The plate 29 is also held by a longitudinal or spanwise sealing rib 37 adjacent the partition 25 which supports the leading edge of the plate. This rib 37 also extends chordwise of the rearward compartment 23 to support the top and bottom edges of the plate 17. To complete this 'picture frame' support of the plate a further rib 38 extends longitudinally or spanwise of the inner surface of the concave flank 44 of the blade adjacent to the pedestals 34; this rib supports the trailing edge of the plate 29.

The portion of the opposed concave pressure flank 44 in the compartment 23 is provided with an array of film cooling holes which in the present instance comprises two rows 32 and 33 spaced apart in such a way as to provide a film of cooling air over the majority of this surface.

This form of cooling may be used on outer surface of the flank 44 where the flow velocities are not so high and losses due to the interference of the film cooling flow are not extensive.

At the extreme trailing edge region of the compartment 23 a plurality of pedestals or pin fins 34 and ribs 35 join the opposed flanks of the trailing edge of the aerofoil, which are otherwise separated to form an air ejection hole or slot 36. The ribs 35 may in fact form extensions of the ribs 30. It will be seen from FIG. 3 that air entering the compartment 23 can only escape via the film cooling holes 32 and 33 or through the perforated plate 29 and out of the slot 36. In flowing from the gap between the plate 29 and the surface of the compartment 23 to the slot 36 the air flows over the pedestals 34 and the ribs 35 providing cooling of the extreme trailing edge region of the aerofoil.

Operation of the cooling system of the mid and trailing edge portions of aerofoil is therefore that the cooling air enters the mid compartment 22 and provides convection cooling of this compartment. At this stage the air is relatively cold and the convection cooling aided by some film cooling is sufficient for this mid portion. The air then flows through the aperture 27 into the trailing edge compartment 23 where part of the air flows through the holes 32 and 33 to film cool the pressure flank 44 of this region of the aerofoil and the remainder flows through the apertured plate 29 to impingement cool the unapertured suction flank 42 of this part of the aerofoil. The spent impingement air then flows over the pedestals 34 and the ribs 35 and leaves the aerofoil through the slot 36 to rejoin the main gas flow of the engine.

It will be seen that the only structure needed within the compartment 23 to provide this cooling comprises the plate 29. Being very thin and flexible the plate is easily assembled into the relatively narrow and non-linear compartment 23 which is constricted in size and shape because of the aerofoil shape involved. An effective cooling system is thus provided in spite of the small space allowed.

It will be understood that there are various modifications which could be made to the embodiment described above. It would for instance be possible to use a different cooling system for the mid and leading edge sections of the vane, and although particularly useful for a vane the invention could be used in cooling the trailing portion of a rotor blade.

We claim:

1. A cooled vane or aerofoil for a gas turbine engine comprising:
   an aerofoil with a leading edge and a trailing edge and having a hollow interior defined by a concave pressure flank and an opposed unapertured convex suction flank;
   partition means extending spanwise in said hollow interior of said aerofoil and dividing a trailing edge compartment from a remainder of said hollow interior;
   means for supplying cooling air to said trailing edge compartment, said means including at least one aperture;
   a thin perforated impingement plate extending spanwise and chordwise in said trailing edge compartment, said impingement plate being spaced from an inner surface of said unapertured convex suction flank and from an inner surface of said concave pressure flank;
   means for loosely holding said perforated impingement plate in position when said vane is inoperative, said means including spanwise spaced and chordwise extending ribs in said trailing edge compartment, said ribs projecting from said inner surface of said unapertured convex suction flank, a plurality of discrete projections in said trailing edge compartment, said discrete projections extending from said inner surface of said concave pressure flank, a spanwise extending sealing rib positioned adjacent said partition means and a further spanwise extending rib positioned adjacent said trailing edge;
   an array of film cooling holes in said concave flank providing communication between said trailing edge compartment and an exterior of said aerofoil;
   and at least one air ejection hole in said trailing edge of said aerofoil and communicating with a space defined between said inner surface of said suction flank and said impingement plate.

2. A cooled vane or blade as claimed in claim 1 and in which said at least one aperture for supplying cooling air to said trailing edge compartment is formed in said partition means.

3. A cooled vane or blade as claimed in claim 2 and in which said remainder of said hollow interior is divided into a leading edge compartment and a mid-section compartment, and in which said at least one aperture in said partition means is positioned adjacent a spanwise end of said partition means, and in which said vane or blade includes means for supplying cooling air to said mid-section compartment at a spanwise position distant from said at least one aperture in said partition means whereby cooling air is caused to traverse spanwise of said mid-section compartment to provide cooling thereof before the cooling air flows into said trailing edge compartment.

4. A cooled vane or blade as claimed in claim 3 and in which said mid-section compartment of said hollow interior of said aerofoil is provided with spanwise spaced ribs extending from its inner surface transverse to the flow of cooling air therein.

5. A cooled vane or blade as claimed in claim 1 and including an array of pedestals in the flow path of cooling air between said space and said at least one air ejection hole.

* * * * *